UNITED STATES PATENT OFFICE.

CARLETON ELLIS, OF MONTCLAIR, NEW JERSEY.

COLOR CONCENTRATE FOR EDIBLE FATS.

1,203,594.

Specification of Letters Patent.

Patented Nov. 7, 1916.

No Drawing.

Application filed December 16, 1915. Serial No. 67,139.

*To all whom it may concern:*

Be it known that I, CARLETON ELLIS, a citizen of the United States, and a resident of Montclair, in the county of Essex and State of New Jersey, have invented certain new and useful Improvements in Color Concentrates for Edible Fats, of which the following is a specification.

This invention relates to butter coloring compounds or compositions and the like and relates particularly to a color concentrate or coloring agent wholly compatible with ordinary butter, thereby enabling the use of such coloring composition in genuine butter without modifying the standard of edibility of the fat.

The invention relates particularly to the use of butter fat as a carrier and solvent for dyestuffs or coloring matter of a character adapted for use in edible fat products including arnotto, certain yellow or orange azo dyes and the like.

In preparing the composition ordinary butter preferably as fresh as possible is pressed, preferably after slow cooling so as to cause seeding of the stearin, etc. On careful pressing an oil which remains in a substantially liquid condition at ordinary temperatures is obtained, the amount of this ordinarily ranged from 40 to 50% of the butter fat employed. Before pressing however, it is preferable to remove the aqueous material and curds by melting and allowing separation to take place or by filtration or in any other suitable manner. The dried liquid butter oil is then saturated or heavily charged with coloring matter such as arnotto and the like to form a concentrate which is preferably sterilized. The dyestuff or color employed is preferably of a vegetable nature, arnotto being especially desirable. In some cases the product may be sterilized by simple pasteurizing in sealed containers. The product is improved in stability by being charged with carbon dioxid gas with consequent elimination of air, thus maintaining the butter oil in a non-oxidizing atmosphere.

Butter oil has marked advantages over cottonseed oil and the like. Cottonseed oil when charged with color does not always blend entirely satisfactorily and besides has the serious disadvantage of introducing into butter a vegetable oil in a greater or less amount depending upon the amount of coloration required. The butter oil on the other hand is highly satisfactory, both as a solvent for the coloring matter and as to its blending qualities in the butter material which is to be colored. When freed from moisture in the manner described a product is obtained which is quite stable and may be preserved in containers for a considerable period of time without any substantial deterioration. While butter oil of the character specified is preferably employed, it is also possible to use butter fat of a higher degree of consistency depending on the season of the year, etc., and in fact, ordinary butter fat may be used especially in hot weather. Of course, when using the unpressed butter fat it is desirable or essential to remove the water and curd and particular care should be taken in pressing the material to be used in warm climates to remove all the casein which deteriorates very rapidly in the presence of moisture. A casein-free butter or butter fat or oil or butter properly sterilized and charged with dyestuff to form a color concentrate and incorporated if necessary with a preservative such as salt, sodium benzoate, carbon dioxid or alcohol and the like tends to remain without appreciable trend to rancidity for a considerable period, thus enabling the compound to be made up in a central plant and shipped to long distances for use as may be required in the coloring of ordinary butter fat. In a similar way very thick cream or other form of butter or raw butter or the raw materials from which butter is made may be used as the vehicle for the coloring agent especially when intended for immediate use but when required of such a character that it will remain stable over a long period the composition specifically illustrated is preferably employed.

What I claim is:—

1. A butter coloring composition comprising the dry liquid constituents of butter fat freed from considerable quantities of the other constituents of normal butter, and being highly charged with artificial coloring matter capable of tinting butter a yellow shade.

2. A butter color concentrate comprising the liquid constituents only of butter fat substantially free from water and casein and at least partially freed from stearin and saturated with yellow coloring matter.

3. A butter color concentrate comprising those constituents only of butter fat which are liquid at ordinary temperatures, the same being substantially free from water and from casein, said material being substantially saturated with yellow coloring matter, all in a sterile condition.

4. A butter color concentrate comprising the liquid constituents only of butter fat substantially saturated with yellow coloring matter.

5. A butter coloring composition comprising at least the normally liquid constituents of butter fat free from casein and containing materially less stearin than ordinary butter, and substantially saturated with yellow coloring material.

6. A butter coloring composition comprising at least the normally liquid constituents of butter fat substantially saturated with yellow coloring material, and charged with a preservative gas.

7. A butter coloring composition comprising dry, normally substantially liquid butter oil substantially saturated with vegetable coloring material of yellow or orange shades.

8. A butter coloring composition comprising substantially only those oily constituents of butter that are substantially liquid at ordinary temperature, heavily charged with a butter-coloring dyestuff.

9. A composition of matter liquid at ordinary temperature, containing butter-coloring, in amount materially greater than in any ordinary butter of normal color, dissolved in butter oil.

CARLETON ELLIS.